(No Model.)
W. S. POSSON.
CORN PLANTER.
No. 600,800. Patented Mar. 15, 1898.
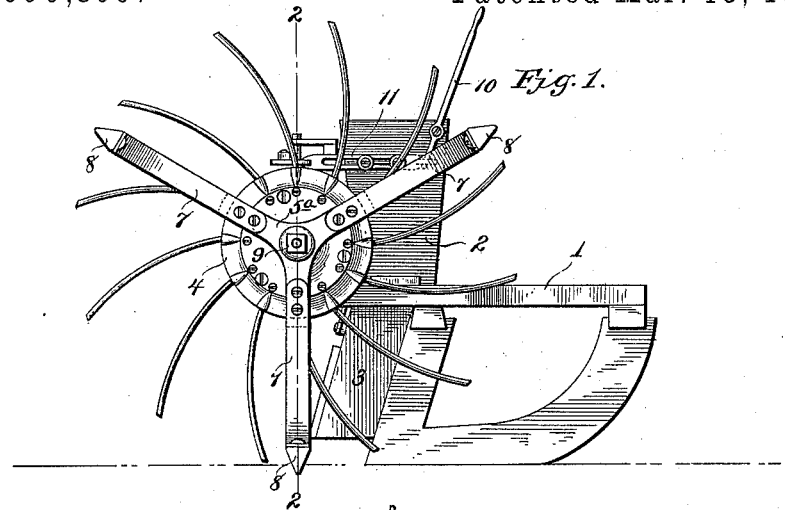
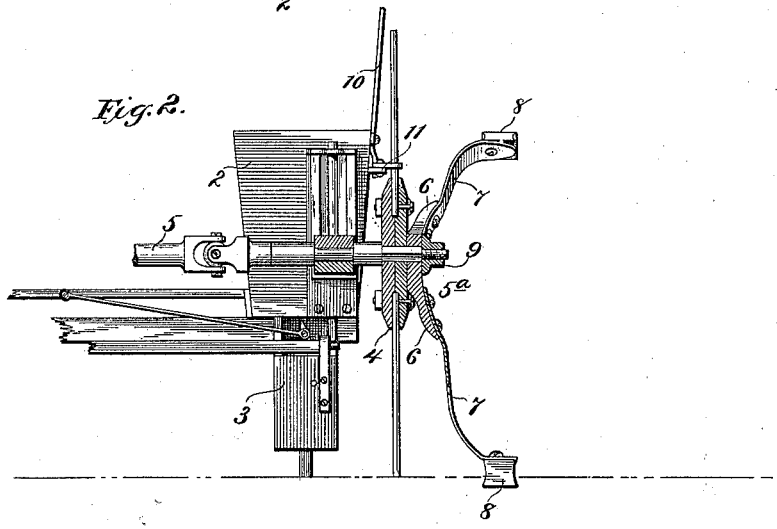
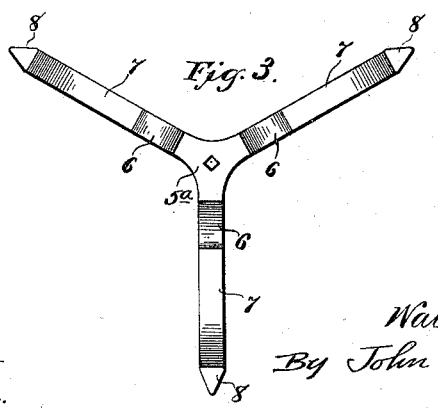
Witnesses
E. C. Wurdeman
Victor J. Evans.
Inventor
Wallace S. Posson
By John Wedderburn.
Attorney

UNITED STATES PATENT OFFICE.

WALLACE S. POSSON, OF O'LEARY, IOWA, ASSIGNOR OF ONE-HALF TO WILLIAM M. BOYLE, OF SAME PLACE.

CORN-PLANTER.

SPECIFICATION forming part of Letters Patent No. 600,800, dated March 15, 1898.

Application filed May 21, 1897. Serial No. 637,545. (No model.)

*To all whom it may concern:*

Be it known that I, WALLACE S. POSSON, of O'Leary, in the county of Plymouth and State of Iowa, have invented certain new and useful Improvements in Corn-Planters; and I do hereby declare the following to be a full, clear, and exact description of the invention, such as will enable others skilled in the art to which it appertains to make and use the same.

This invention relates to check-rower attachments for corn-planters; and the same consists of a spider having a rectangular opening at its center and radially-extending arms, spring-arms secured to the radially-extending arms, and shoes or marking devices secured to the terminals of said spring-arms and adapted to move with the wheel and mark the ground at predetermined intervals.

In the accompanying drawings, Figure 1 represents an end elevation of a corn-planter, showing my improved check-rower attachment applied to the wheel thereof. Fig. 2 is a detail sectional view thereof, taken on the line 2 2 of Fig. 1; and Fig. 3 is a detail view of my check-rower attachment removed.

Similar reference-numerals indicate corresponding parts in all the figures of the drawings.

1 represents a portion of the framework of a corn-planter; 2, the corn-hopper; 3, the discharge-spout, and 4 the rimless wheel, which latter is rigidly secured to the end of a shaft 5. The shaft 5 near its extreme end is squared a short distance to receive thereon the rimless wheel and my improved check-rower attachment, which comprises a spider 5ª, having a squared opening in its center, adapted to fit the squared end of the shaft, and radial arms 6, to which are securely fastened spring-arms 7. These spring-arms project outwardly about on a level with the ends of the spokes of the wheel, and are thence bent outwardly to receive thereon shoes or marking devices 8, to which they are securely fastened.

During the rotation of the wheel and consequent travel of the corn-planter over the surface of the earth these shoes or marking devices 8 are brought into contact with the ground and leave depressions therein to denote the places where the corn is to be planted, and when it is desired to make these depressions at closer intervals the spider 5ª is removed and another one having a greater number of arms is substituted therefor.

It will be observed that the end of the axle is screw-threaded to receive upon it a tightening-nut 9, which serves to securely hold the spider in place, as well as permits of the ready removal thereof, and in order to further brace the spider against rotative movement the hub of the rimless wheel may be provided with studs or projections, between which the radial arms will lie, and thus give greater security thereto.

Any suitable mechanism may be employed for automatically discharging or delivering the corn from the hopper at regular intervals; but in order that the check-rower may be set so that the corn will be delivered at the proper time thereto I provide an operating-lever 10, fulcrumed to the hopper 2 and having pivoted to its lower end a link 11, which is adapted to engage one of the spokes, so that said wheel and the shaft upon which it is mounted and to which is also secured the spider 6 may be moved so as to bring one of the shoes 8 opposite the point of discharge of the hopper at the time the corn is delivered therefrom.

It will thus be seen that my invention provides in a simple and inexpensive manner a check-rower device which can be readily attached to the corn-planters now in use, which is durable and efficient, and which can be readily removed and replaced by another in case of breakage or where it is desirable to change the distance between the hills for the corn.

Modifications may be made without departing from the essential features of my invention, and I do not wish to be understood as limiting myself to the precise details of construction herein shown and described, but reserve the right to make such changes and alterations therein as may be held to fairly fall within its spirit and scope.

Having thus described my invention, what I claim, and desire to secure by Letters Patent, is—

1. A check-rower attachment for corn-planters, comprising a spider having a square opening and radial arms, spring-arms secured to said radial arms, and shoes or marking devices secured to the terminals of said spring-arms and adapted to move with the wheel and mark the ground at predetermined intervals, substantially as described.

2. The combination with the axle of a corn-planter having its end threaded, and a portion thereof squared, of a spider having a square opening adapted to engage the squared portion of the axle, and radial arms arranged thereon, spring-arms secured to said radial arms, having shoes or marking devices secured to their terminals, and a nut adapted to engage the threaded end of the axle, substantially as described.

In testimony whereof I have signed this specification in the presence of two subscribing witnesses.

WALLACE S. POSSON.

Witnesses:
THOMAS GORMAN,
A. Y. WEIR.